United States Patent
Vierk et al.

(10) Patent No.: US 10,378,631 B2
(45) Date of Patent: Aug. 13, 2019

(54) FRICTION CLUTCH HAVING A FIRST FRICTION MATERIAL ENGAGEABLE IN A PARTIALLY ENGAGED POSITION AND A SECOND FRICTION MATERIAL ENGAGEABLE IN A FULLY ENGAGED POSITION

(71) Applicant: BorgWarner Inc., Auburn Hills, MI (US)

(72) Inventors: David T. Vierk, Mokena, IL (US); Benjamin A. Siegel, Chicago, IL (US)

(73) Assignee: BorgWarner Inc., Auburn Hills, MI (US)

( * ) Notice: Subject to any disclaimer, the term of this patent is extended or adjusted under 35 U.S.C. 154(b) by 601 days.

(21) Appl. No.: 15/136,400

(22) Filed: Apr. 22, 2016

(65) Prior Publication Data
US 2017/0307057 A1    Oct. 26, 2017

(51) Int. Cl.
*F16H 45/02*    (2006.01)
*F16D 13/46*    (2006.01)
(Continued)

(52) U.S. Cl.
CPC ............ *F16H 45/02* (2013.01); *F16D 13/46* (2013.01); *F16D 13/76* (2013.01); *F16D 2013/642* (2013.01); *F16H 2045/0278* (2013.01)

(58) Field of Classification Search
None
See application file for complete search history.

(56) References Cited

U.S. PATENT DOCUMENTS 8,191,698 B2 * 6/2012 Pritchard .............. F16D 29/005
                                                          192/85.6
8,241,180 B2   8/2012 Klump et al.
(Continued)

FOREIGN PATENT DOCUMENTS

WO    WO 2014/180479 A1    11/2014
WO    WO 2015/116684 A1    8/2015

OTHER PUBLICATIONS

English language abstract and machine-assisted English translation for WO 2014/180479 extracted from espacenet.com database on Apr. 28, 2016, 16 pages.

*Primary Examiner* — Colby M Hansen
(74) *Attorney, Agent, or Firm* — Howard & Howard Attorneys PLLC

(57) ABSTRACT

A friction clutch selectively and directly couples a rotatable drive and driven members. The friction clutch includes first and second clutch members movable toward and away from each other along an axis between disengaged, partially engaged, and fully engaged positions. The first and second clutch members are independently coupled to the drive and driven members. The friction clutch further includes first and second friction materials positioned between the first and second clutch members. The first and second friction materials are each independently coupled to one of the first and second clutch members and are each independently engageable with an engagement surface of the other one of the first and second clutch members. The first friction material engages the respective engagement surface in the partially engaged position and the second friction material engages the respective engagement surface in the fully engaged position.

24 Claims, 14 Drawing Sheets

(51) Int. Cl.
   *F16D 13/76*   (2006.01)
   *F16D 13/64*   (2006.01)

(56) References Cited

U.S. PATENT DOCUMENTS

| | | | |
|---|---|---|---|
| 8,905,212 B2 | 12/2014 | Vierk et al. | |
| 2002/0027053 A1* | 3/2002 | Back | F16H 45/02 |
| | | | 192/3.3 |
| 2003/0010588 A1* | 1/2003 | Maienschein | F16H 45/02 |
| | | | 192/3.29 |

* cited by examiner

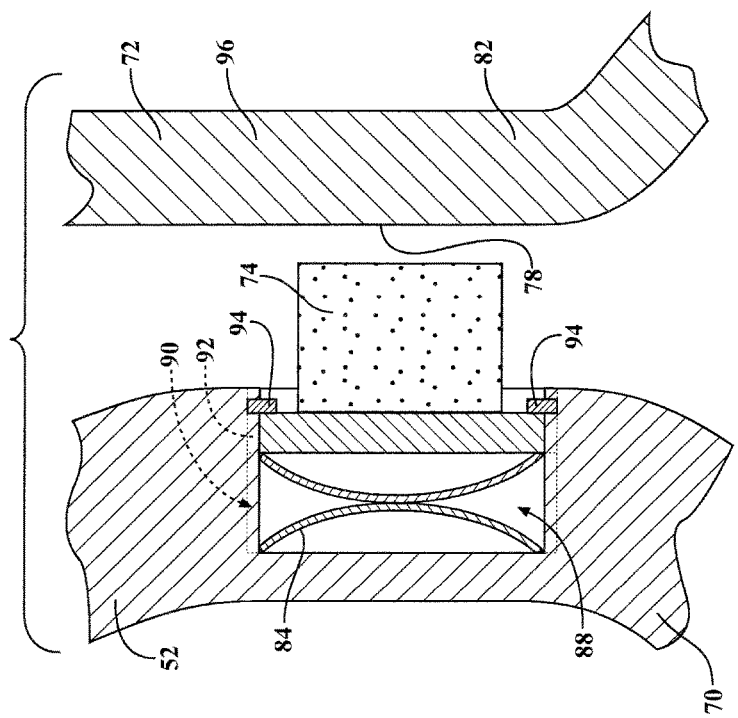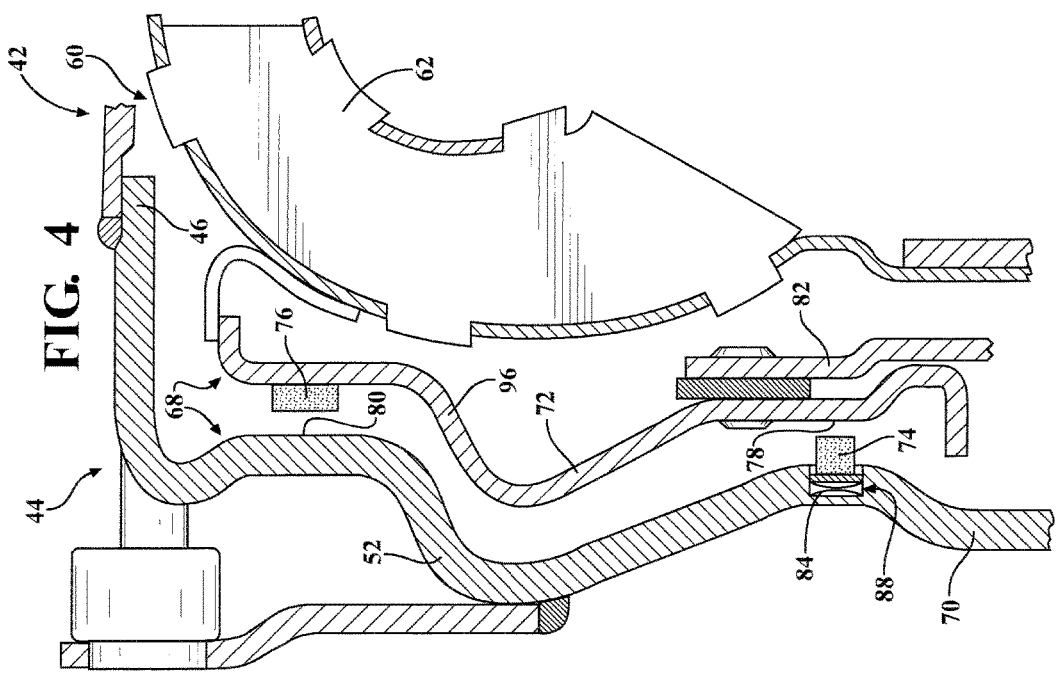

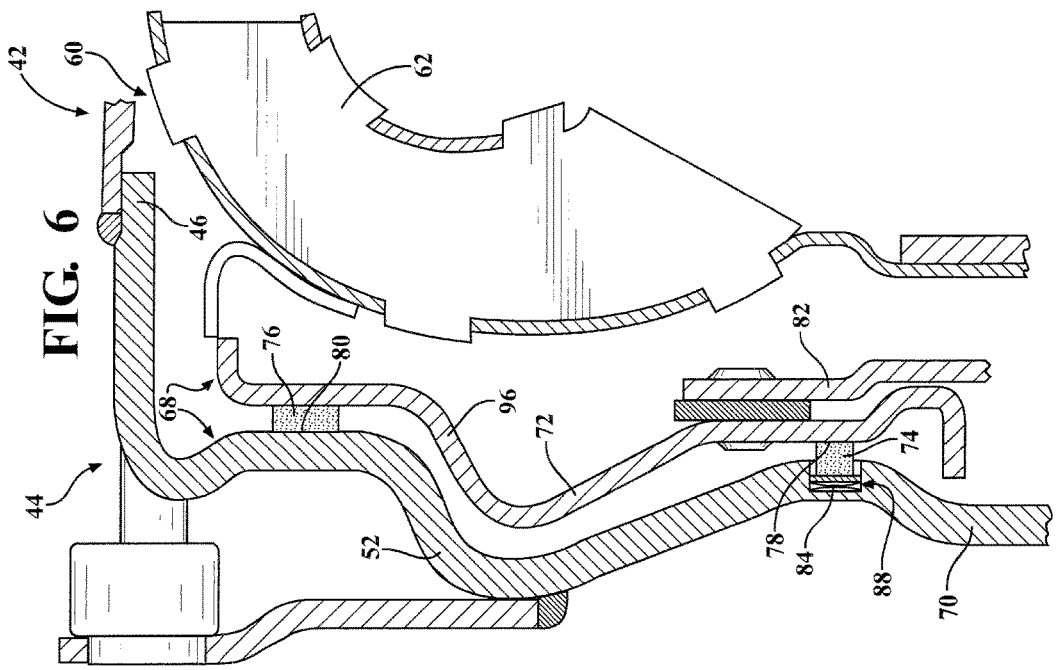
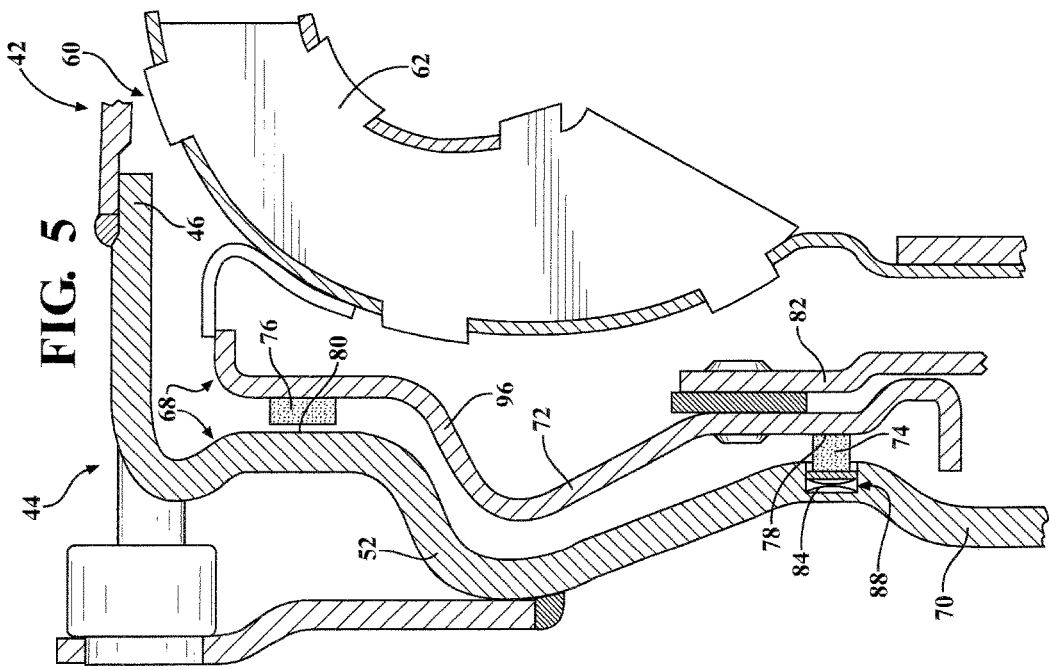

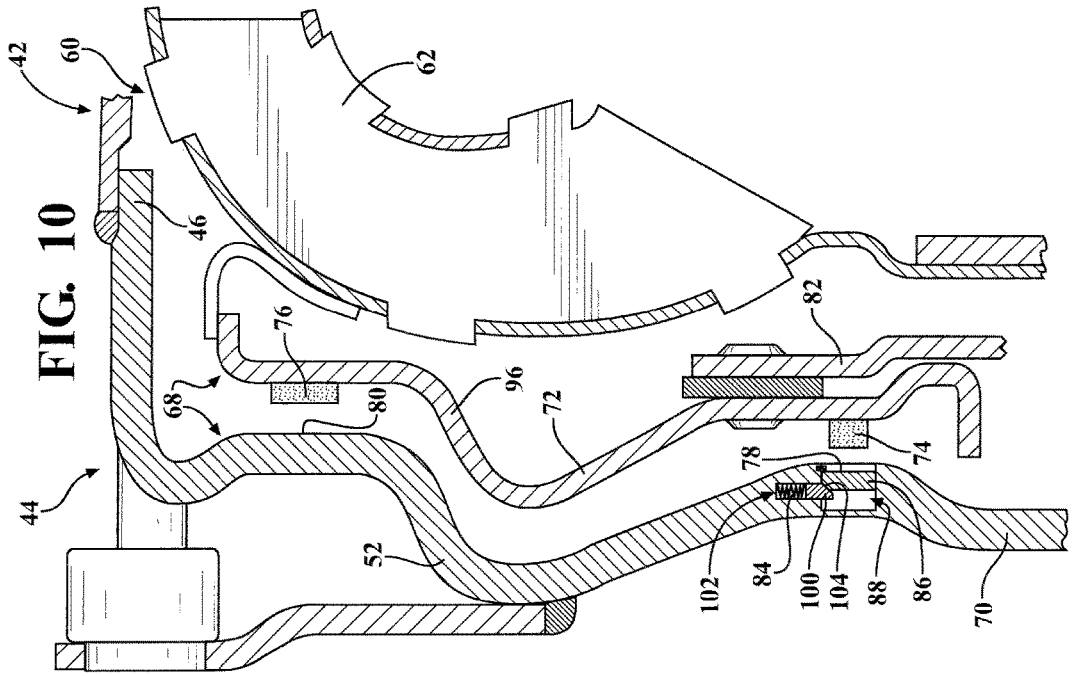
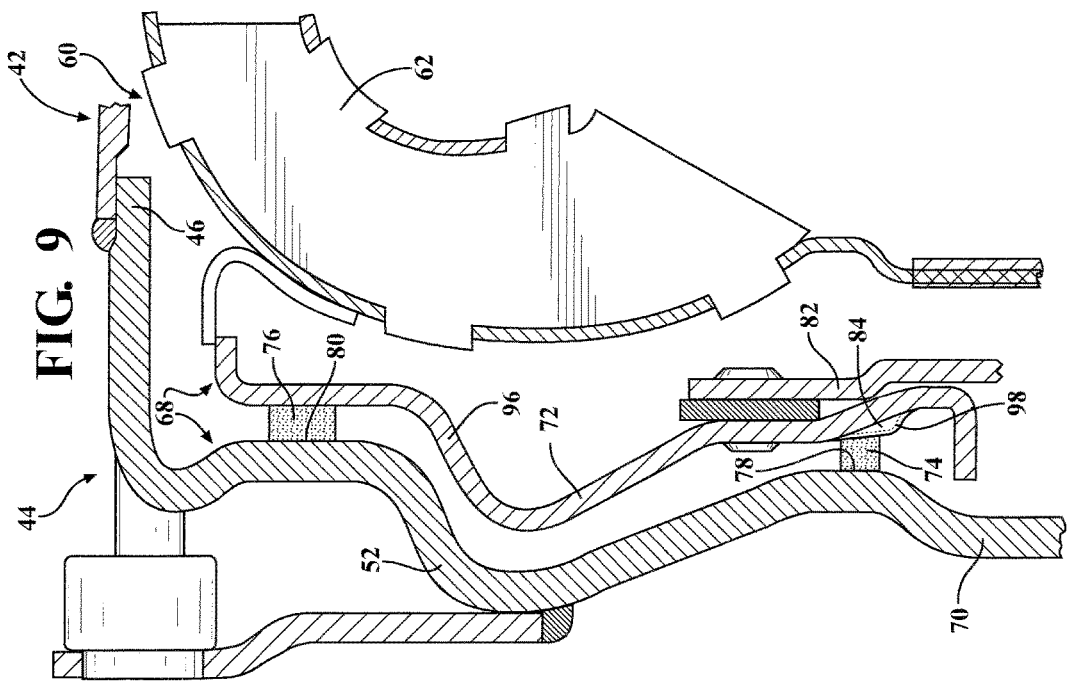

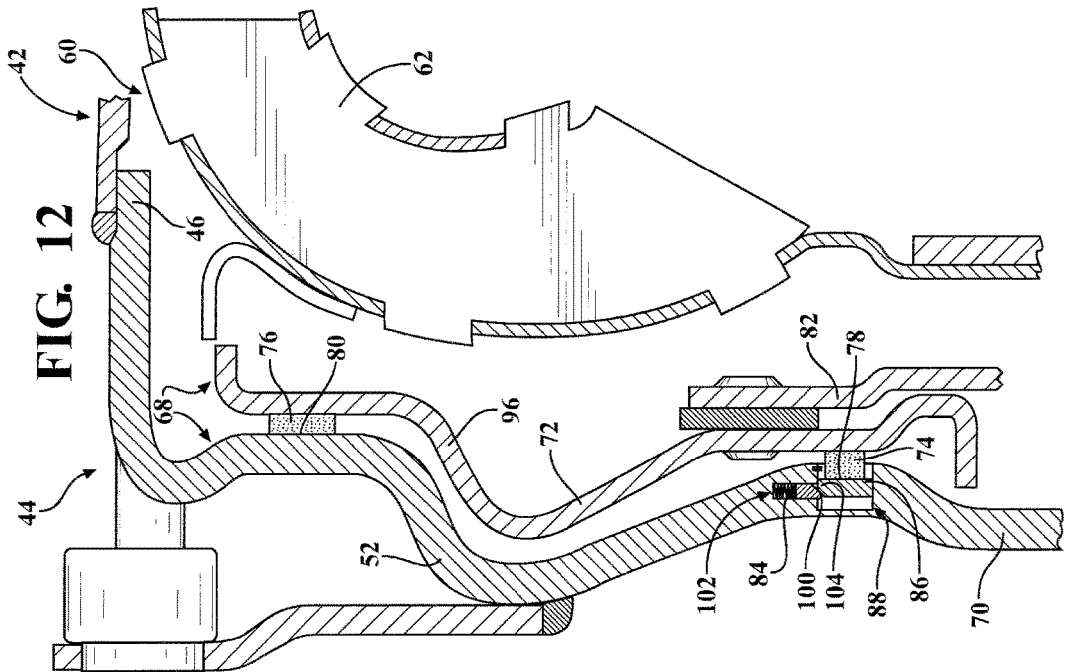
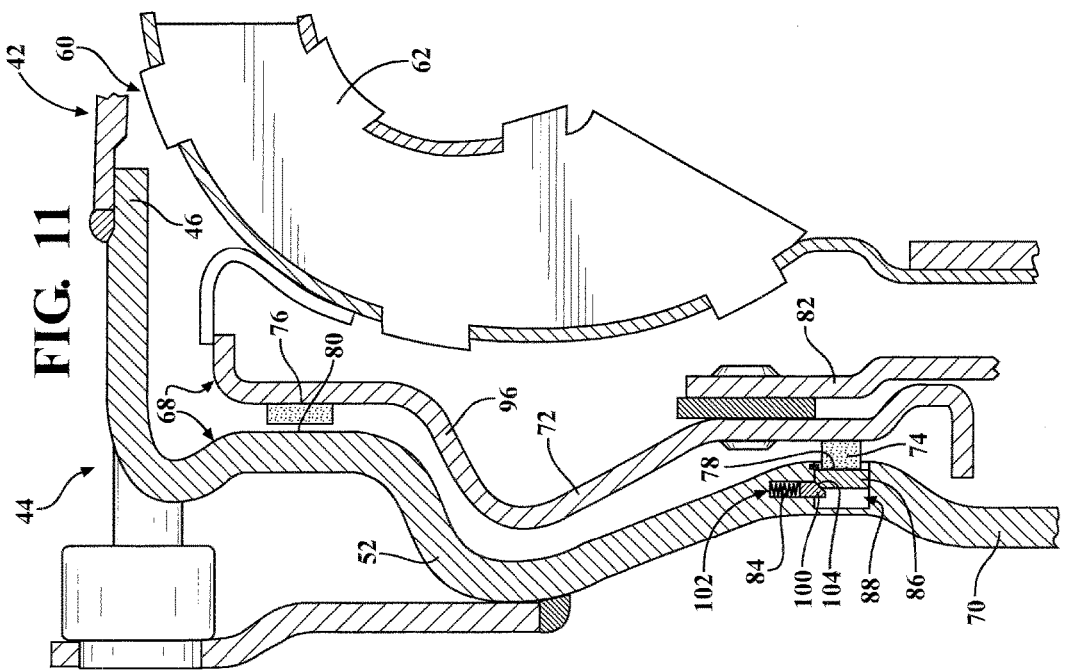

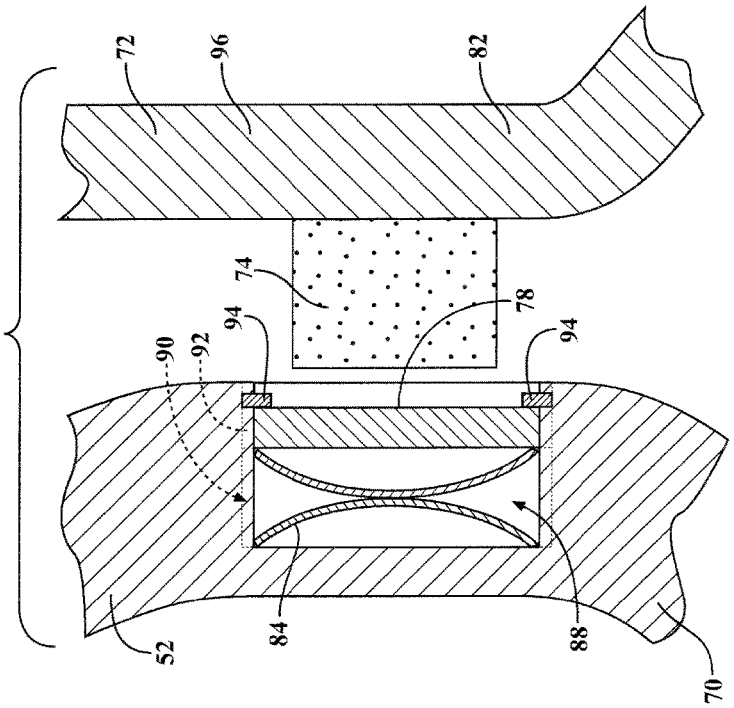
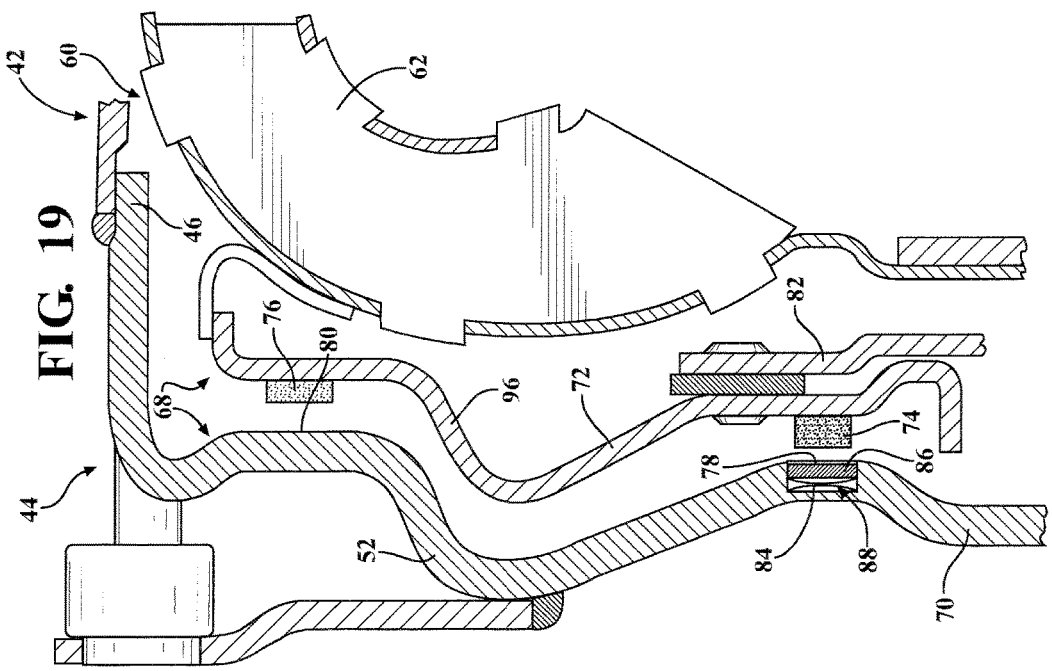

FRICTION CLUTCH HAVING A FIRST FRICTION MATERIAL ENGAGEABLE IN A PARTIALLY ENGAGED POSITION AND A SECOND FRICTION MATERIAL ENGAGEABLE IN A FULLY ENGAGED POSITION

BACKGROUND OF THE INVENTION

1. Field of the Invention

A friction clutch for selective direct coupling of a rotatable drive member to a rotatable driven member.

2. Description of Related Art

Friction clutches have use in many different applications for selective direct coupling of two rotatable members. In automotive applications, friction couplings may be found in various locations in the drivetrain of the vehicle. One application of the friction clutch is with a torque converter, which fluidly couples an engine to a transmission. The fluid coupling of the torque converter allows for slip and torque multiplication between the engine and the transmission, which is useful for accelerating the vehicle. However, when the velocity of the vehicle becomes steady, the motor and the transmission rotate at substantially the same angular velocity. The slip facilitated by the fluid coupling leads to energy losses when the vehicle is travelling at a steady velocity. The friction clutch has a piston coupled to the transmission and presenting a friction material and a cover coupled to the engine and presenting an engagement surface. The piston moves the friction material into engagement with the engagement surface to create a rotatable direct coupling between the engine and the transmission, which reduces energy losses between the engine and the transmission when the vehicle is travelling at a steady velocity.

The engagement of the friction material with the engagement surfaces causes a sudden direct coupling between the engine and the transmission, which produces wear between the friction material and the engagement surface. Furthermore, the sudden direct coupling between the engine and the transmission may cause the vehicle to lurch forward as any slight variance in angular velocity between the engine and the transmission becomes equalized. As such, there remains a need to provide an improved friction clutch.

SUMMARY OF THE INVENTION AND ADVANTAGES

The subject invention provides for a friction clutch for selective direct coupling of a rotatable drive member to a rotatable driven member. The friction clutch comprises a first clutch member and a second clutch member movable toward and away from each other along an axis between a disengaged position, a partially engaged position, and a fully engaged position. One of the first and second clutch members is configured to be coupled to the drive member and the other one of the first and second clutch members configured to be coupled to the driven member. The friction clutch further comprises a first friction material and a second friction material both positioned between the first and second clutch members. The first and second friction materials are each independently coupled to one of the first and second clutch members and are each independently engageable with an engagement surface of the other one of the first and second clutch members. The first friction material is engageable with the respective engagement surface in the partially engaged position for initiating the selective direct coupling between the drive member and the driven member. The second friction material is engageable with the respective engagement surface in the fully engaged position for completing the selective direct coupling between the drive member and the driven member.

Accordingly, the partially engaged position of the first and second clutch members allows slight difference in angular velocities of the first and second clutch members (commonly referred to as slip) while the fully engaged position allows the first and second clutch members to rotate at substantially equal angular velocities (commonly referred to as lock-up). As such, the partially and fully engaged positions allow for gradual direct engagement of the first and second clutch members, rather than sudden and abrupt lock-up between the first and second clutch members.

BRIEF DESCRIPTION OF THE DRAWINGS

Advantages of the subject invention will be readily appreciated as the same becomes better understood by reference to the following detailed description when considered in connection with the accompanying drawings.

FIG. 4 is a cross-sectional view of a portion of the torque converter and showing a first friction material coupled to and biased away from the first clutch member and a second friction material coupled to the second clutch member, with the first and second clutch members in a disengaged position.

FIG. 4A is a cross-sectional view of a portion of the first and second clutch members shown in FIG. 4.

FIG. 5 is a cross-sectional view of the friction clutch shown in FIG. 4, showing the first and second clutch members in a partially engaged position.

FIG. 6 is a cross-sectional view of the friction clutch shown in FIG. 4, showing the first and second clutch members in a fully engaged position.

FIG. 9 is a cross-sectional view of the friction clutch shown in FIG. 7, showing the first and second clutch members in the fully engaged position.

FIG. 10 is a cross-sectional view of a portion of the torque converter and showing an engagement block coupled to and biased away from the first clutch member with a camming block and the second friction material coupled to the second clutch member, with the first and second clutch members in the disengaged position.

FIG. 11 is a cross-sectional view of the friction clutch shown in FIG. 10, showing the first and second clutch members in the partially engaged position.

FIG. 12 is a cross-sectional view of the friction clutch shown in FIG. 10, showing the first and second clutch members in the fully engaged position.

FIG. 19 is a cross-sectional view of a portion of the torque converter and showing the engagement block coupled to and biased away from the first clutch member and the second friction material coupled to the second clutch member, with the first and second clutch members in the disengaged position.

FIG. 19A is a cross-sectional view of a portion of the first and second clutch members shown in FIG. 19.

DETAILED DESCRIPTION OF THE INVENTION

Figure 1:
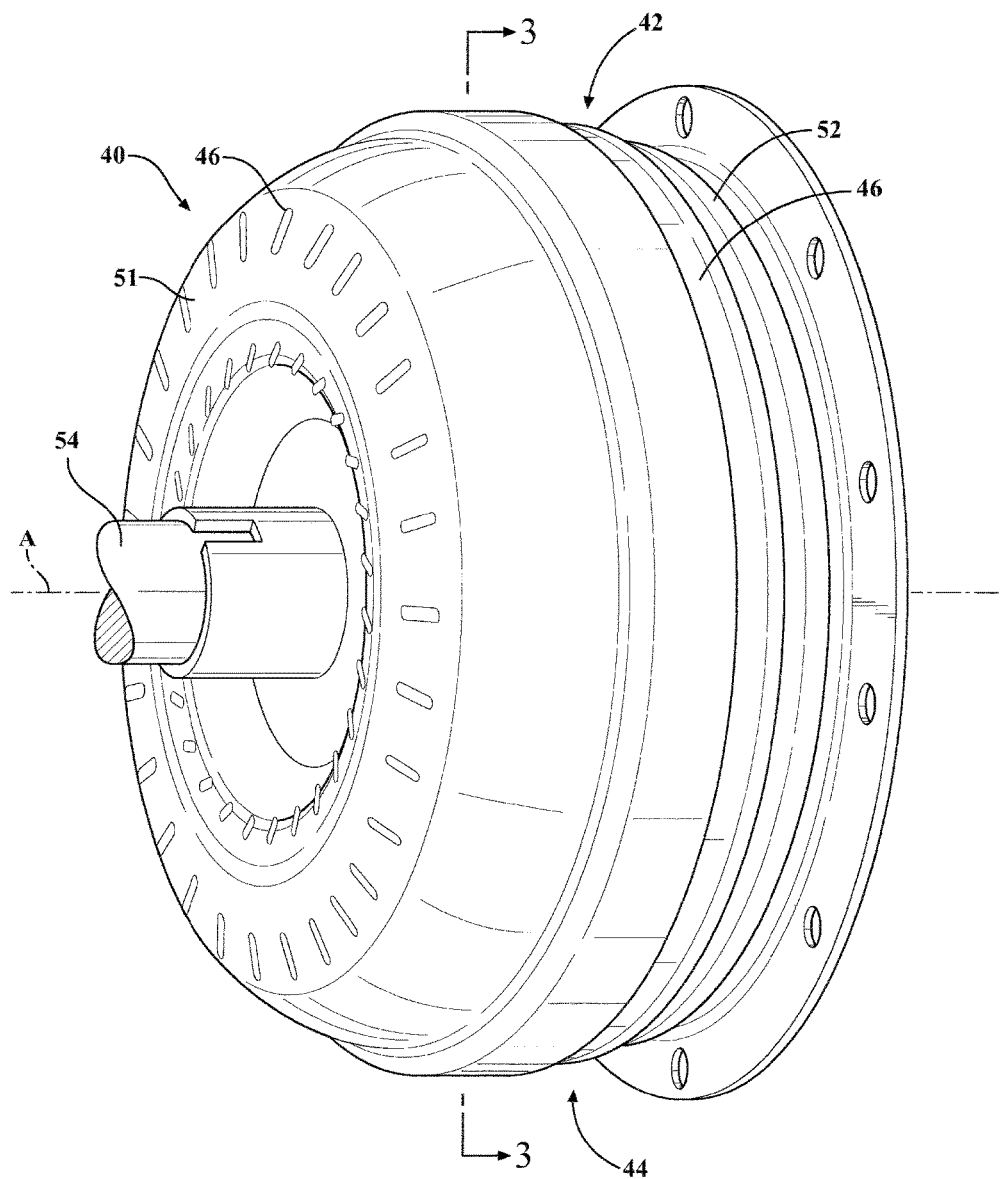
FIG. 1 is a perspective view of a torque converter.
Figure 2A:
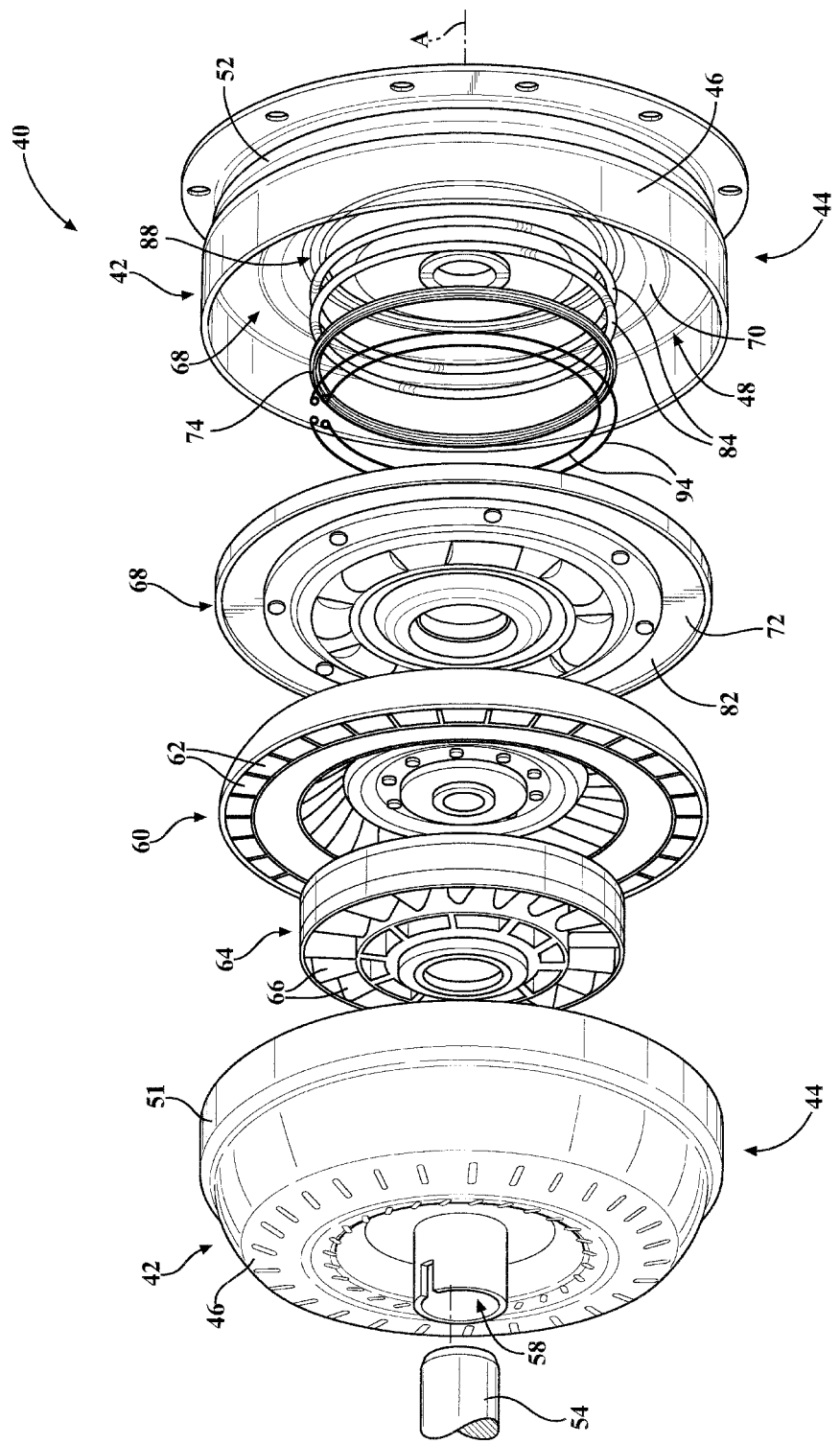
FIG. 2A is an exploded view of the torque converter showing a housing, an impeller, a turbine, a stator, and a first friction material.
Figure 2B:
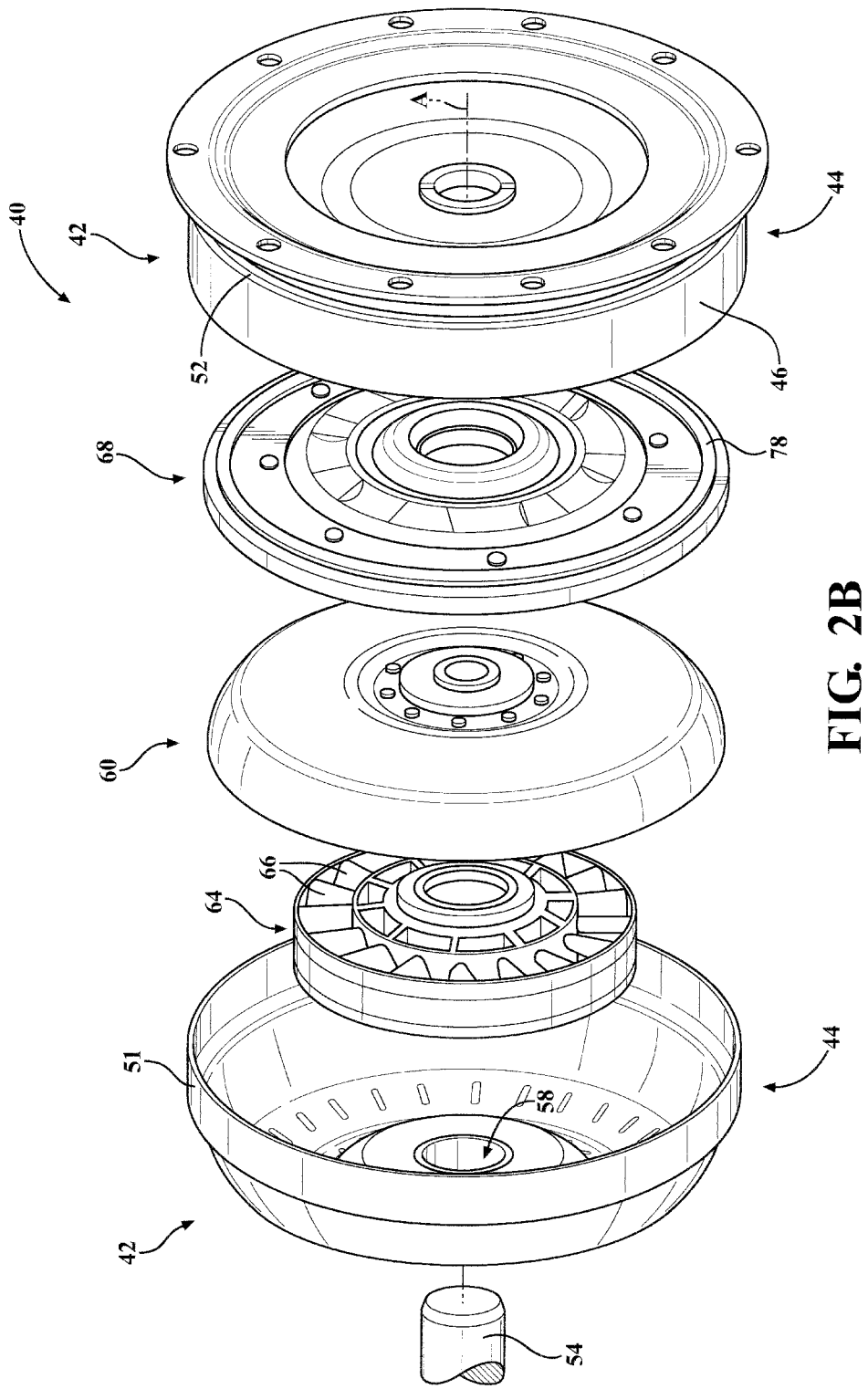
FIG. 2B is an exploded view of the torque converter showing the housing, the impeller, the turbine, the stator, and a second friction material.
Figure 3:
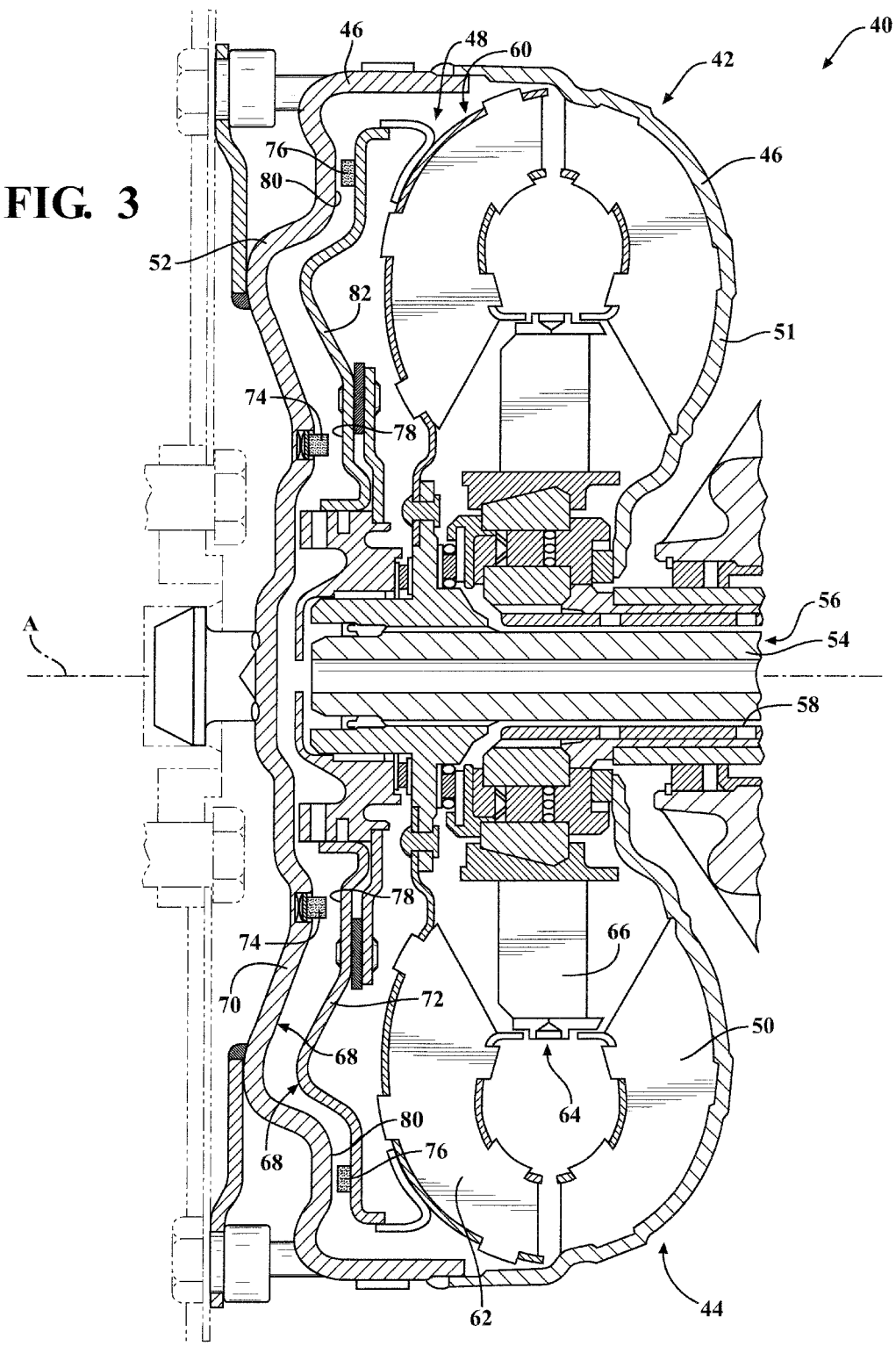
FIG. 3 is a cross-sectional view of torque converter as shown in FIG. 1 taken along 3-3 and showing a friction clutch having a first clutch member and a second clutch member.

Referring to the Figures, wherein like numerals indicates like or corresponding parts throughout the several views, a torque converter 40 is generally shown in FIGS. 1-3. The torque converter 40 is typically used within automobiles for selectively coupling a prime mover to a transmission. In one embodiment, the prime mover is an internal combustion engine. One having skill in the art will appreciate that the prime mover may be an electric motor, a fuel cell, or any other source of motive power. In one embodiment, the transmission is an automatic transmission. One having skill in the art will appreciate that the transmission may be a standard transmission (also known as a manual transmission), a continuously variable transmission (CVT), or any other mechanism for transmitting motion. Although the torque converter 40 is described herein between the prime mover and the transmission, one having skill in the art will appreciate that the torque converter 40 could be used anywhere in the vehicle for transmitting motion between the prime mover and wheels of the vehicle. Furthermore, one having skill in the art will appreciate that the torque converter 40 may have non-vehicular applications as well where selective coupling is desired.

The torque converter 40 comprises an impeller 42 as a drive member 44 and is configured to be rotatably fixed to the prime mover. In one embodiment, the impeller 42 is fixed to a flex plate of the prime mover. The prime mover rotates the flex plate. When the prime mover is an engine, the flex plate is fixed to, and rotates with, a crankshaft of the engine. One having skill in the art will appreciate that the impeller 42 may be rotatably fixed to the prime mover in any suitable manner.

As shown in FIGS. 2A, 2B, and 3, the impeller 42 may have a housing 46 defining a cavity 48 and a plurality of vanes 50 extending from the housing 46 into the cavity 48. The housing 24 may be further defined as a first housing section 51 and a second housing section 52 both defining the cavity 48. The first and second housing sections 51, 52 may be fluidly sealed such that any fluid is retained within the cavity 48. One having skill in the art will appreciate that the impeller 42 may be unitary component. Furthermore, one having skill in the art will appreciate that the impeller 42 may be any number of components.

As shown in the Figures, the second housing section 52 of the impeller 42 may be rotatably fixed to the prime mover such that the second housing section 52 is disposed between prime mover and both of the first housing section 51 and the vanes 50. One having skill in the art will appreciate that the opposite may be true (i.e., the first housing section 51 may be rotatably fixed to the prime mover).

As shown in FIG. 3, the torque converter 40 further comprises a shaft 54 as a driven member 56 and configured to be rotatably fixed to the transmission. In one embodiment, the shaft 54 may be splined to the transmission to rotatably fix the shaft 54 to the transmission. The shaft 54 may be fixed to the transmission in any suitable manner.

The first housing section 51 of the impeller 42 may define a hole 58 with the shaft 54 extending through the hole 58. As such, the shaft 54 may be partially disposed within the cavity 48. The shaft 54 may be retained and sealed within the hole 58 of the first housing section 51 by a bearing. As such, the impeller 42 and the shaft 54 may rotate independent of one another. One having skill in the art will appreciate that in another embodiment, the second housing section 52 may define a hole with the shaft 54 extending therethrough.

The torque converter 40 further comprises a turbine 60 rotatably fixed to the shaft 54 and fluidly coupled to the drive member 44, with the fluid coupling between the turbine 60 and the drive member 44 facilitating indirect coupling between the turbine 60 and the drive member 44 to multiply torque transfer between the drive member 44 and the driven member 56. The turbine 60 may be disposed within the cavity 48 and may be fixed to the shaft 54. As such, the turbine 60 may rotate with the shaft 54 independent of the impeller 42. The turbine 60 may extend radially from the shaft 54 and present a plurality of vanes 62. The plurality of vanes 62 extend toward the vanes 50 of the impeller 42.

As shown in FIGS. 2A, 2B, and 3, the torque converter 40 may further comprise a stator 64. The stator 64 is disposed between the impeller 42 and the turbine 60. The stator 64 may include a one-way clutch which couples the stator 64 to the shaft 54 when the stator 64 rotates in one direction. The stator 64 may further include a plurality of vanes 66.

A fluid is disposed within the cavity 48 of the housing 46. When the impeller 42 rotates, the vanes 50 of the impeller 42 move the fluid outward by centrifugal force. The faster the impeller 42 (and, correspondingly, the prime mover) rotates, the greater the force with which the fluid is moved outward. The fluid flows off of the vanes 50 of the impeller 42 and into engagement with the vanes 62 of the turbine 60.

The flow of the fluid across the vanes 62 of the turbine 60 causes the turbine 60 (and, correspondingly, the shaft 54 and the transmission) to rotate. The turbine 60 rotates slower than the impeller 42 because of energy losses in the fluid between the impeller 42 and the turbine 60, which results in torque multiplication.

The vanes 50 of the impeller 42 direct the fluid downwardly toward the shaft 54, and then toward the impeller 42. The stator 64 is disposed between the turbine 60 and the impeller 42. The fluid flows across the vanes 66 of the stator 64, causing the stator 64 to rotate. The vanes 66 of the stator 64 redirect the path of the fluid flow toward the impeller 42. The redirection of the fluid causing the stator 64 to rotate, which results in further torque multiplication.

Above is a description of a general configuration of a torque converter. One having skill in the art will appreciate that the present invention may use any configuration of a torque converter without escaping the scope of the present invention.

As shown in FIG. 3, the torque converter 40 further comprises a friction clutch 68 for selective direct coupling of the rotatable drive member 44 to the rotatable driven member 56. The friction clutch 68 comprises a first clutch member 70 and a second clutch member 72 movable toward and away from each other along an axis A between a disengaged position (as shown in FIGS. 4, 7, 10, 13, 16, and 19), a partially engaged position (as shown in FIGS. 5, 8, 11, 14, 17, and 20), and a fully engaged position (as shown in FIGS. 6, 9, 12, 15, 18, and 21). One of the first and second clutch members 70, 72 is coupled to the drive member 44 and the other one of the first and second members is coupled to the driven member 56. As shown in the Figures and described above, the drive member 44 is the impeller 42 and the driven member 56 is the shaft 54. One having skill in the art will appreciate that the drive and driven members 44, 56 may be any rotating components that are selectively coupled.

As shown in FIGS. 4-21, the friction clutch 68 further comprises a first friction material 74 and a second friction material 76 both positioned between the first and second clutch members 70, 72. The first and second friction materials 74, 76 are each independently coupled to one of the first and second clutch members 70, 72 and each independently engageable with an engagement surface 78, 80 of the other one of the first and second clutch members 70, 72. The first friction material 74 is engageable with the respective engagement surface 78 in the partially engaged position (as shown in FIGS. 5, 8, 11, 14, 17, and 20) to initiate the selective direct coupling between the drive member 44 and the driven member 56. The second friction material 76 is engageable with the respective engagement surface 80 in the fully engaged position (as shown in FIGS. 6, 9, 12, 15, 18, and 21) to complete the selective direct coupling between the drive member 44 and the driven member 56.

The housing 46 may define one of the first and second clutch members 70, 72 such that the one of the first and second clutch members 70, 72 is integrally coupled with the impeller 42. Likewise, one of the first and second clutch members 70, 72 may be further defined as a piston 82 which is fluidly actuated to move the first and second clutch members 70, 72 toward and away from each other along the axis A. In the embodiment shown in the Figures, the second housing section 52 defines the first clutch member 70 while the piston 82 defines the second clutch member 72. It is to be appreciated that the opposite may be true (i.e., the piston 82 may define the first clutch member 70 and the housing 46 may define the second clutch member 72). Furthermore, one having skill in the art will appreciate that any suitable components in the torque converter 40, or in any other suitable application, may define the first and second clutch members 70, 72.

The movement of the first clutch member 70 and the second clutch member 72 toward and away from each other along the axis A refers to any movement facilitating changing the position of the first and second clutch members 70, 72 relative to one another. Said differently, as viewed from either one of the first and second clutch members 70, 72, the first and second clutch members 70, 72 move toward and away from one another. Movement of the first and second clutch members 70, 72 toward and away from each other may refer to numerous embodiments and configurations. In one embodiment, as shown in the Figures, one of the first and second clutch members 70, 72 may be fixed relative to the vehicle while the other of the first and second clutch members 70, 72 may move relative the vehicle. More specifically, as shown in the Figures, the first clutch member 70 may be fixed along the axis A and the second clutch member 72 may be movable along the axis A with the movement of the first and second clutch members 70, 72 toward and away from each other facilitated by movement of the second clutch member 72 along the axis A. One having skill in the art will appreciate that the second clutch member 72 may be fixed along the axis A and the first clutch member 70 may be moveable along the axis A. Alternatively, both of the first and second clutch members 70, 72 may be moveable relative to the vehicle. Said differently, both the first and second clutch members 70, 72 may be movable along the axis A.

As described above, the friction clutch 68 comprises the first clutch member 70 and the second clutch member 72 movable toward and away from each other along the axis A between the disengaged position, the partially engaged position, and the fully engaged position. When the first and second clutch members 70, 72 are in the disengaged position (as shown in FIGS. 4, 7, 10, 13, 16, and 19), the first and second clutch members 70, 72 are spaced from one another and rotate freely and independently of one another (i.e., the first and second clutch members 70, 72 are disconnected) and the torque converter is in what is commonly referred to as an open state. When the friction clutch 68 is used with the torque converter 40 and the first and second clutch members 70, 72 are in the disengaged position, the impeller 42 and the shaft 54 (i.e., the drive and driven members 44, 56) are coupled to one another by the fluid coupling between the impeller 42 and the turbine 60. The properties of the fluid allow slight variations in angular velocities of each of the impeller 42 and the shaft 54, which results in torque multiplication between the prime mover and the transmission. Torque multiplication is beneficial for the purpose of accelerating the vehicle. However, when the vehicle is maintaining a desired velocity such that acceleration is minimal (which is typically the shaft 54 rotating at an angular velocity of at least 90% of the angular velocity of the impeller 42), torque multiplication is not necessary and can be a source of unnecessary energy loss.

To reduce energy losses through the fluid coupling when the vehicle is maintaining a desired velocity, direct engagement between prime mover and transmission occurs through the friction clutch 68. Direct engagement refers to engagement of the first and second friction members. When used with the torque converter 40, direct engagement allows the prime mover and the transmission to rotate at substantially equal angular velocities. As described herein, direct engagement may occur in two positions: the partially engaged position and the fully engaged position. One having skill in the art will appreciate that direct engagement may occur in more than two positions.

The partially engaged position (as shown in FIGS. 5, 8, 11, 14, 17, and 20) and the fully engaged position (as shown in FIGS. 6, 9, 12, 15, 18, and 21) facilitate direct engagement of the first and second clutch members 70, 72 along two gain curves. Specifically, the partially engaged position may facilitate a low-torque gain curve for smooth engagement at low pressure between the first and second clutch members 70, 72. The fully engaged position may facilitate a high-torque holding gain curve at higher pressure between the first and second clutch members 70, 72. Said differently, the partially engaged position may allow a slight difference in the angular velocities of the first and second clutch members 70, 72 (commonly referred to as slip with the torque converter 40 in what is commonly referred to as a slipping state) while the fully engaged position may allow the first and second clutch members 70, 72 to rotate at substantially equal angular velocities (commonly referred to as lock-up with the torque converter 40 in what is commonly referred to as a fully locked state). As such, the partially and fully engaged positions allow for gradual direct engagement of the first and second clutch members 70, 72, rather than sudden and abrupt lock-up between the first and second clutch members 70, 72.

The terms "partially engaged position" and "fully engaged position" refer to relative engagement of the first and second friction materials 74, 76 with the respective engagement surfaces 78, 80. More specifically, in the partially engaged position the first friction material 74 engages the respective engagement surface 78 while in the fully engaged position the second friction material 76 (moreover, potentially both the first and second friction materials 74, 76 as will be described below) engages the respective engagement surface 80. The partially engaged position and the fully engaged position do not necessarily relate to a specific state of the torque converter 40 (i.e., the slipping state and the fully locked state as described above). For example, there may be lock-up between the first and second clutch members 70, 72 (i.e., the fully locked state) when the first and second clutch members 70, 72 are in the partially engaged position. Similarly, there may be slip between the first and second clutch members 70, 72 (i.e., the slipping state) when the first and second clutch members 70, 72 are in the fully engaged position.

Furthermore, the first and second friction materials 74, 76 may be interchangeable. Said differently, the second friction material 76 may engage the respective engagement surface 80 in the partially engaged position and the first friction material 74 may engage the respective engagement surface 78 in the fully engaged position.

As shown in FIG. 3, the first and second friction materials 74, 76 may be radially offset about the axis A. Said differently, the first and second friction materials 74, 76 may be spaced from one another relative to the axis A. Furthermore, the first and second friction materials 74, 76 may each have a substantially annular configuration such that the first and second friction materials 74, 76 are concentrically disposed about the axis A. The concentric orientation about the axis A facilitates even frictional engagement about the axis A. One having skill in the art will appreciate that the first and second friction materials 74, 76 may have any suitable shape and configuration about the axis A to facilitate engagement of each of the first and second friction materials 74, 76 with the respective engagement surfaces 78, 80.

As further shown in FIG. 3, the first friction material 74 may be positioned between the axis A and the second friction material 76. One having skill in the art will appreciate that the second friction material 76 may be positioned between the axis A and the first friction material 74.

The first friction material 74 may be coupled to the first clutch member 70, as shown in FIGS. 4-6. Alternatively, the first friction material 74 may be coupled to the second clutch member 72 as shown in FIGS. 7-21. The second friction material 76 may be coupled to the second clutch member 72 as shown in FIG. 4-21. Furthermore, it is to be appreciated that the second friction material 76 may be coupled to the first clutch member 70.

As shown in FIGS. 3-21, the first and second friction materials 74, 76 may be positioned on substantially parallel planes extending transverse to the axis A in the disengaged position. The substantially parallel planes facilitate stepped engagement of the first and second friction materials 74, 76 as the first and second clutch members 70, 72 move toward and away from one another along the axis A. Said differently, the substantially parallel planes facilitate engagement of the first friction material 74 with the respective engagement surface 78 along one of the planes in the partially engaged position, with the first and second clutch members 70, 72 moving closer to one another in the fully engaged position allowing the second friction material 76 to engage the respective engagement surface 80 along the other one of the planes. As shown in FIGS. 3-21, the substantially parallel planes may be perpendicular to the axis A. One having skill in the art will appreciate that the substantially parallel planes may be disposed at any angle relative to the axis A.

The engagement of the second friction material 76 with the respective engagement surface 80 may transmit a greater amount of torque from the drive member 44 to the driven member 56 than the engagement of the first friction material 74 with the respective engagement surface 78. More specifically, the engagement of the second friction material 76 with respective engagement surface 80 in the fully engaged position may facilitate lock-up between the first and second clutch members 70, 72, as described above. On the other hand, the engagement of the first friction material 74 with the respective engagement surface 78 in the partially engaged position may facilitate a slipping direct engagement, as described above. The engagement of the first friction material 74 with the respective engagement surface 78 will be better understood through further description below.

Figure 16:
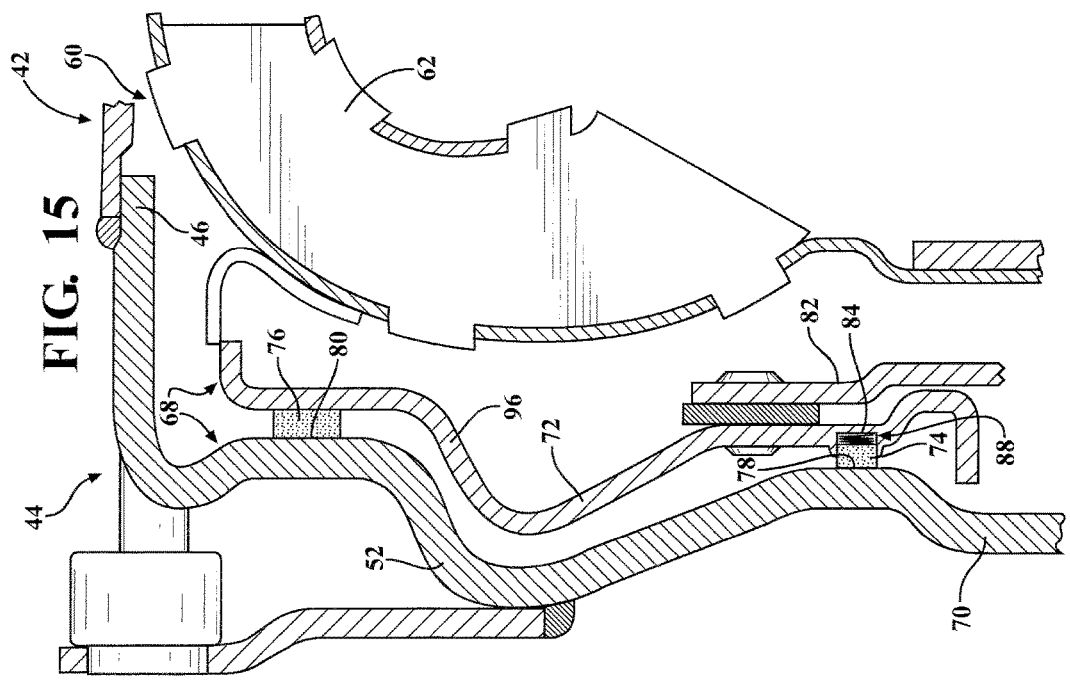
FIG. 16 is a cross-sectional view of a portion of the torque converter and showing the first friction material coupled to and integrally biased away from the second clutch member and the second friction material coupled to the second clutch member, with the first and second clutch members in the disengaged position.
Figure 17:
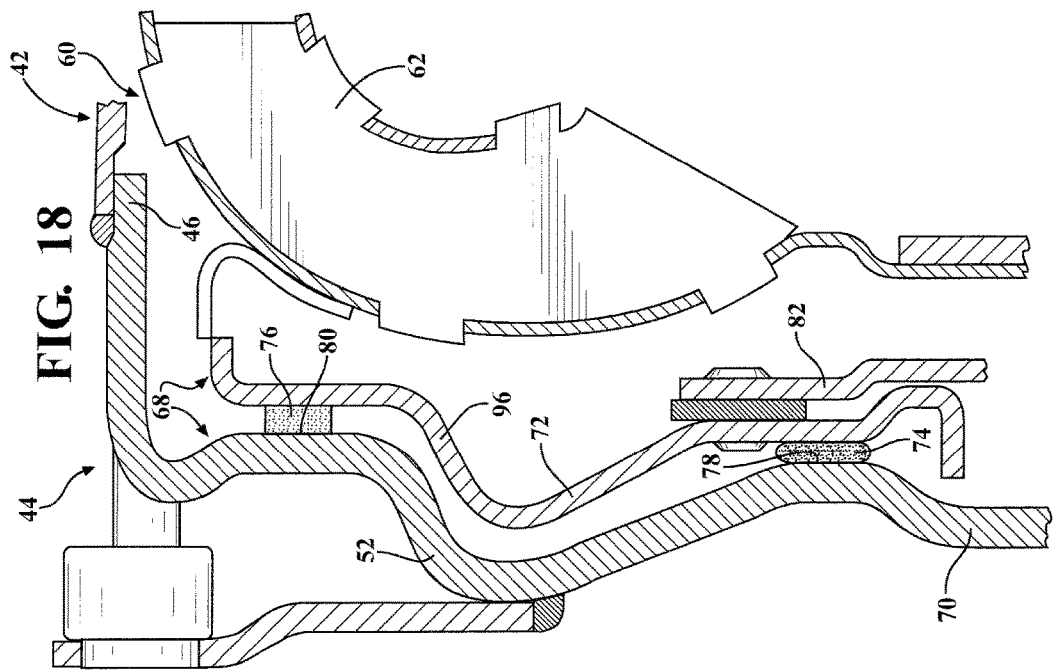
FIG. 17 is a cross-sectional view of the friction clutch shown in FIG. 16, showing the first and second clutch members in the partially engaged position.
Figure 18:
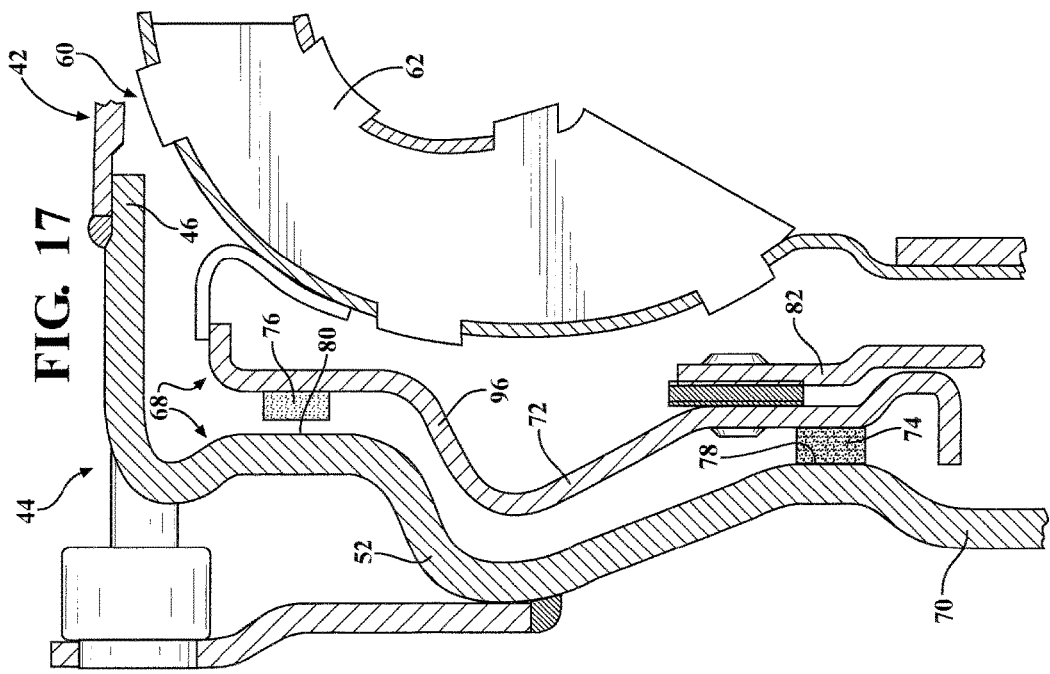
FIG. 18 is a cross-sectional view of the friction clutch shown in FIG. 16, showing the first and second clutch members in the fully engaged position.
Figure 20:
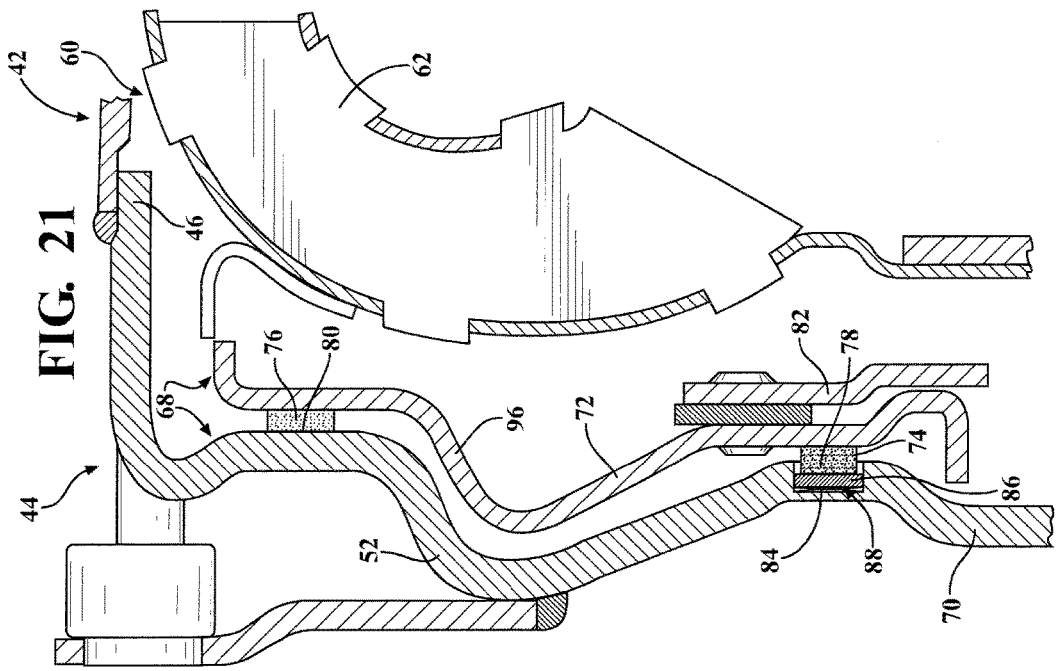
FIG. 20 is a cross-sectional view of the friction clutch shown in FIG. 19, showing the first and second clutch members in the partially engaged position.
Figure 21:
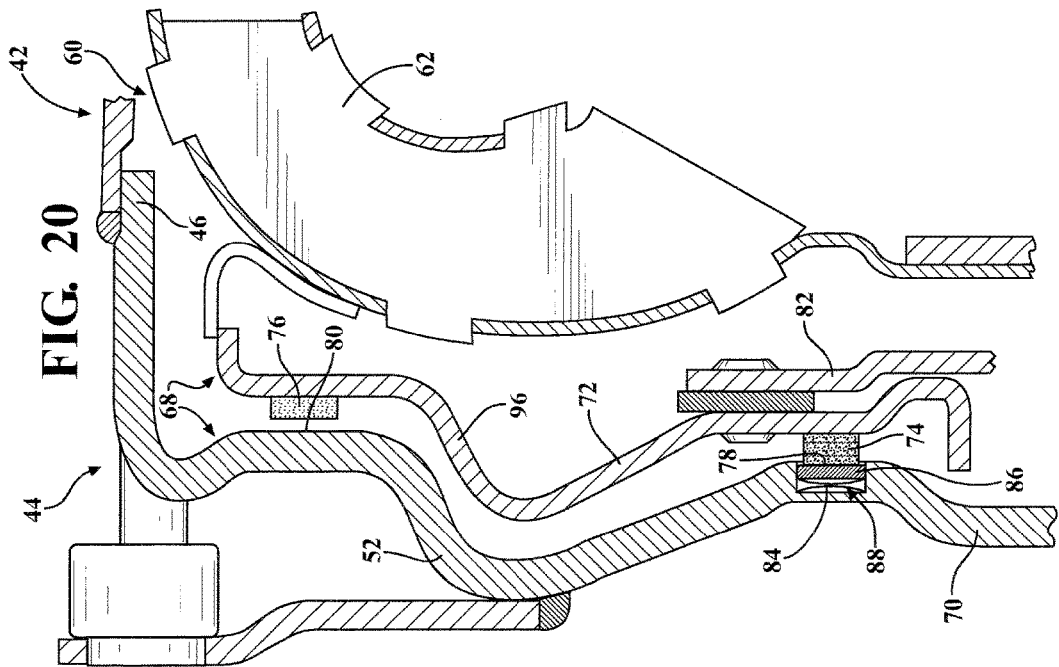
FIG. 21 is a cross-sectional view of the friction clutch shown in FIG. 19, showing the first and second clutch members in the fully engaged position.

The first and second friction materials 74, 76 may be comprised of a wet friction material. Specifically, the wet friction material of the first and second friction materials 74, 76 may be a paper-based friction material. Alternatively, wet friction material of the first and second friction materials 74, 76 may be a carbon-weaved friction material. One having skill in the art will appreciate that the first and second friction materials 74, 76 may be comprised of any suitable friction material. The first and second friction materials 74, 76 may be comprised of the same wet friction material. Alternatively, the first friction material 74 and the second friction material 76 may be comprised of different wet friction materials as shown in FIGS. 16-18 and described in greater detail below.

As shown in FIGS. 4-21, one of the first friction material 74 and the respective engagement surface 78 may be biased toward the other one of the first friction material 74 and the respective engagement surface 78 to progressively increase frictional engagement between the first and second clutch members 70, 72 as the first and second clutch members 70, 72 move from the partially engaged position to the fully engaged position. Said differently, the bias exerted on the one of the first friction material 74 facilitates further movement of the first and second clutch members 70, 72 toward each other to the fully engaged position and biases the first friction material 74 into engagement with the respective engagement surface 78 such that further movement toward the fully engaged position increases the friction between the first friction material 74 and the respective surface. As such, the friction between the first and second clutch members 70, 72 progressively increases between the partially and fully engaged positions, which facilitates progressive direct engagement between the first and second clutch members 70, 72.

Although not explicitly shown in the Figures, one having skill in the art will appreciate that the second friction material 76 may be biased into engagement with the respective engagement surface 80. Moreover, both the first and second friction materials 74, 76 may be biased into engagement with the respective engagement surfaces 78, 80. For the sake of simplicity, the biasing of the first friction material 74 is described in detail herein, the teachings of which may be applicable to the biasing of the second friction material 76.

As shown in FIGS. 4-9 and 13-18, the first friction material 74 may be biased toward the respective engagement surface 78. Alternatively, the respective engagement surface 78 may be biased toward the first friction material 74, as shown in FIGS. 10-12 and 19-21.

The friction clutch 68 may further include a biasing member 84 coupled to and biasing the one of the first friction material 74 and the respective engagement surface 78, which is biased toward the other one of the first friction material 74 and the respective engagement surface 78, as shown in FIGS. 4-15 and 19-21. As shown in FIGS. 4-9, 13-15, and 19-21, the biasing member 84 may bias in a direction substantially parallel to the axis A. Alternatively, the biasing member 84 may bias in a direction transverse to the axis A, as shown in FIGS. 10-12. The transverse direction may be substantially perpendicular to the axis A. One having skill in the art will appreciate that the transverse direction may be any suitable angle relative to the axis A.

As shown in FIGS. 4-15 and 19-21, the biased one of the first friction material 74 and the respective engagement surface 78 may be biased away from the one of the first and second clutch members 70, 72 to which the biased first friction material 74 or the biased respective engagement surface 78 is coupled. Said differently, the biasing member 84 may be disposed between the biased one of the first friction material 74 and the respective engagement surface 78 and the one of the first and second clutch members 70, 72 which the biased first friction material 74 or the biased respective engagement surface 78 is biased away from.

When the respective engagement surface 78 of the first friction material 74 is biased (as shown in FIGS. 10-12 and 19-21), the friction clutch 68 may further include an engagement block 86 defining the respective engagement surface 78. The biasing member 84 may engage and bias the engagement block 86 away from the one of the first and second clutch members 70, 72 to which the biased respective engagement surface 78 is coupled.

The engagement block 86 may have a substantially annular configuration corresponding with the substantially annular configuration of the first friction material 74 as described above. One having skill in the art will appreciate that the engagement block 86 may have any suitable shape and configuration about the axis A to facilitate engagement of the first friction material 74 with the respective engagement surface 78.

As shown in FIGS. 4-6, 10-12, and 19-21. The one of the first and second clutch members 70, 72 from which the one of the first friction material 74 and the respective engagement surface 78 is biased may define a channel 88. The channel 88 may have a substantially annular configuration corresponding with the substantially annular configuration of the first friction material 74 or the engagement block 86 as described above. One having skill in the art will appreciate that the channel 88 may have any suitable shape and configuration about the axis A corresponding with the one of the first friction material 74 and the respective engagement surface 78.

As shown in the FIGS. 4-6 and 19-21, the biasing member 84 may be disposed in the channel 88 and engaging the one of the first and second clutch members 70, 72. One of the first friction material 74 and the engagement block 86 may be at least partially disposed in the channel 88.

As shown in FIGS. 10-15, the biasing member 84 may be a helical compression spring capable of being longitudinally compressed between the one of the first friction material 74 and the engagement block 86 and the one of the first and second clutch members 70, 72 to bias the one of the first friction material 74 and the engagement block 86. Alternatively, the biasing member 84 may be a wave washer, as shown in FIGS. 2A, 3-6, and 19-21, capable of laterally deflecting between the one of the first friction material 74 and the engagement block 86 and the one of the first and second clutch members 70, 72 to bias the one of the first friction material 74 and the engagement block 86. One having skill in the art will appreciate that the biasing member 84 may be any suitable component capable of biasing one of the first friction material 74 and the respective engagement surface 78.

The biasing member 84 may be a single component capable of biasing the one of the first friction material 74 and the respective engagement surface 78. For example, the biasing member 84 may be disposed about the axis A such that the biasing member 84 may have a substantially annular configuration, similar to the substantially annular configuration of the one of the first friction material 74 and the engagement block 86. The substantially annular configuration of the biasing member 84 evenly supports the one of the first friction material 74 and the engagement block 86 evenly about the axis A. One having skill in the art will appreciate that the biasing member 84 may be any single component capable of biasing the one of the first friction material 74 and the respective engagement surface 78.

Alternatively, the biasing member 84 may be a plurality of biasing members 84 capable of biasing the one of the first friction material 74 and the respective engagement surface 78. The plurality of springs may be spaced from one another radially about the axis A to evenly bias the one of the first friction material 74 and the respective engagement surface 78. Alternatively, the plurality of biasing members 84 may each have a substantially annular configuration about the axis A, as described above, and may engage one another to bias the one of the first friction material 74 and the engagement block 86 evenly about the axis A. One having skill in the art will appreciate that the plurality of components comprising the biasing member 84 may be any number of component disposed in any suitable configuration capable of biasing the one of the first friction material 74 and the respective engagement surface 78.

The one of the first and second clutch members 70, 72 from which the one of the first friction material 74 and the respective engagement surface 78 is biased may define at least one groove 90, as shown in FIGS. 4A and 19A. More specifically, the at least one groove 90 may be defined transverse to the channel 88 such that the groove 90 opens into the channel 88. Moreover, the groove 90 may extend along the axis A. One having skill in the art will appreciate that the groove 90 may have any suitable configuration.

The biased one of the first friction material 74 and the engagement block 86 may have a leg 92 extending into the groove 90. The extension of the groove 90 along the axis A allows the leg 92 of the biased one of the first friction material 74 and the engagement block 86 to move therein along the axis A against the bias of the biasing member 84. The leg 92 engages the one of the first and second clutch member 72 that defines the at least one groove 90 to prevent rotation of the one of the first friction material 74 and the engagement block 86 about the axis A. By doing so, the friction between the first friction material 74 and the respective engagement surface 78 is transmitted to both of the first and second clutch members 70, 72 rather than allowing the first friction material 74 and the respective engagement surface 78 to rotate with one of the first clutch member 70 and the second clutch member 72. One having skill in the art will appreciate that the biased one of the first friction material 74 and the engagement block 86 may be retained about the axis A in any suitable manner.

As shown in FIGS. 4A and 19A, the friction clutch 68 may further include at least one snap ring 94 engaged with the one of the first and second clutch members 70, 72 defining the channel 88. The at least one snap ring 94 partially closes the channel 88 with the one of the first friction member and the engagement block 86 at least partially disposed in the channel 88 engaging the at least one snap ring 94. The at least one snap ring 94 retains the biasing member 84 and the one of the first friction member and the engagement block 86 in the channel 88. One having skill in the art will appreciate that the biasing member 84 and the one of the first friction member and the engagement block 86 may be retained in the channel 88 in any suitable manner.

Figure 7:
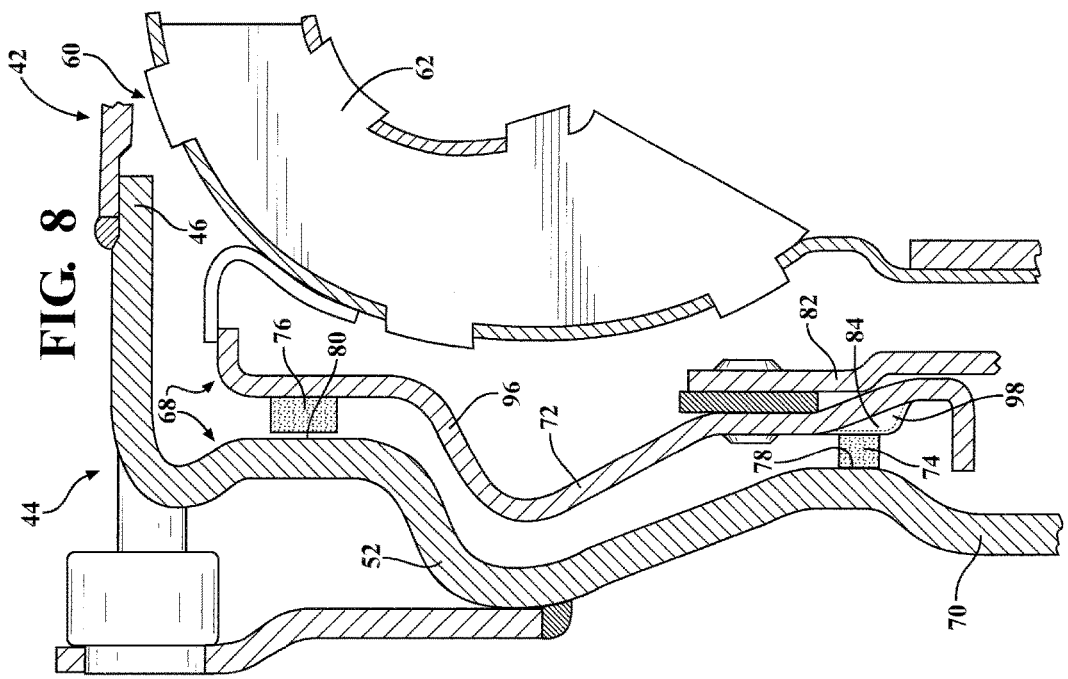
FIG. 7 is a cross-sectional view of a portion of the torque converter and showing the first friction material coupled to and biased away from the second clutch member by a flange of the second clutch member, and the second friction material coupled to the second clutch member, with the first and second clutch members in the disengaged position.
Figure 8:
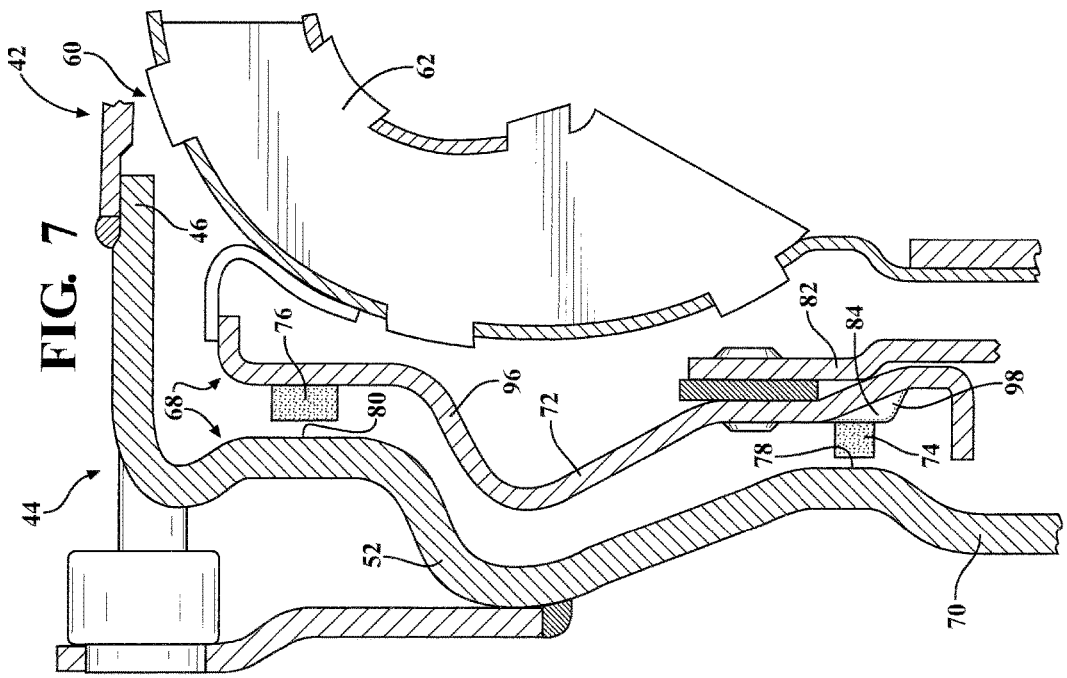
FIG. 8 is a cross-sectional view of the friction clutch shown in FIG. 7, showing the first and second clutch members in the partially engaged position.
Figure 13:
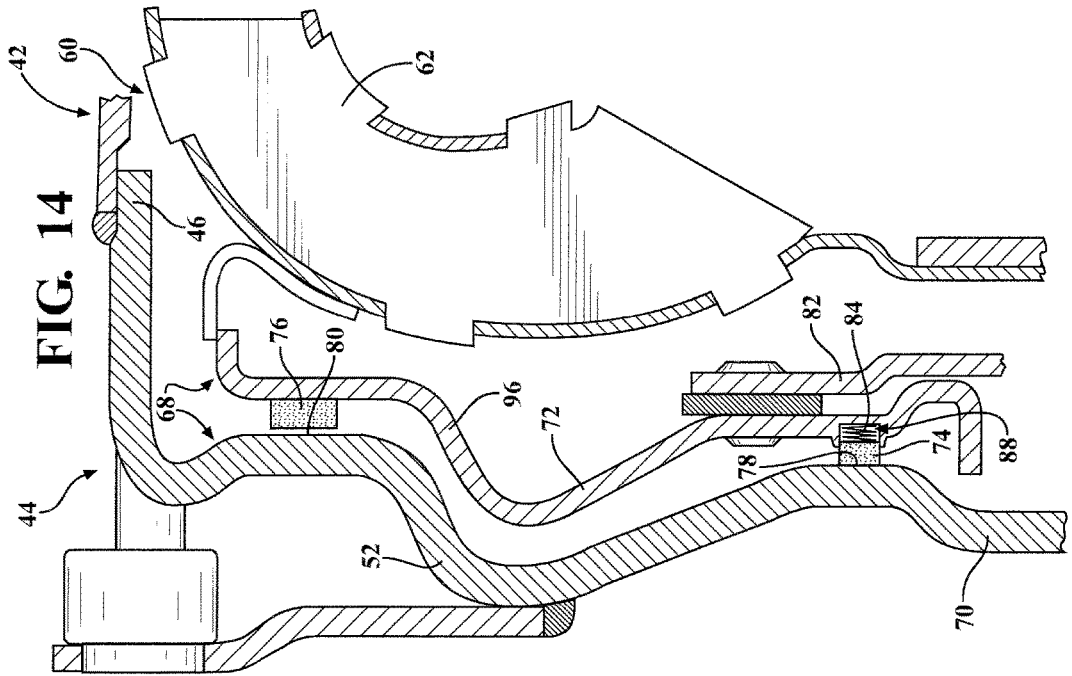
FIG. 13 is a cross-sectional view of a portion of the torque converter and showing the first friction material coupled to and biased away from the second clutch member by a biasing member and the second friction material coupled to the second clutch member, with the first and second clutch members in the disengaged position.
Figure 14:
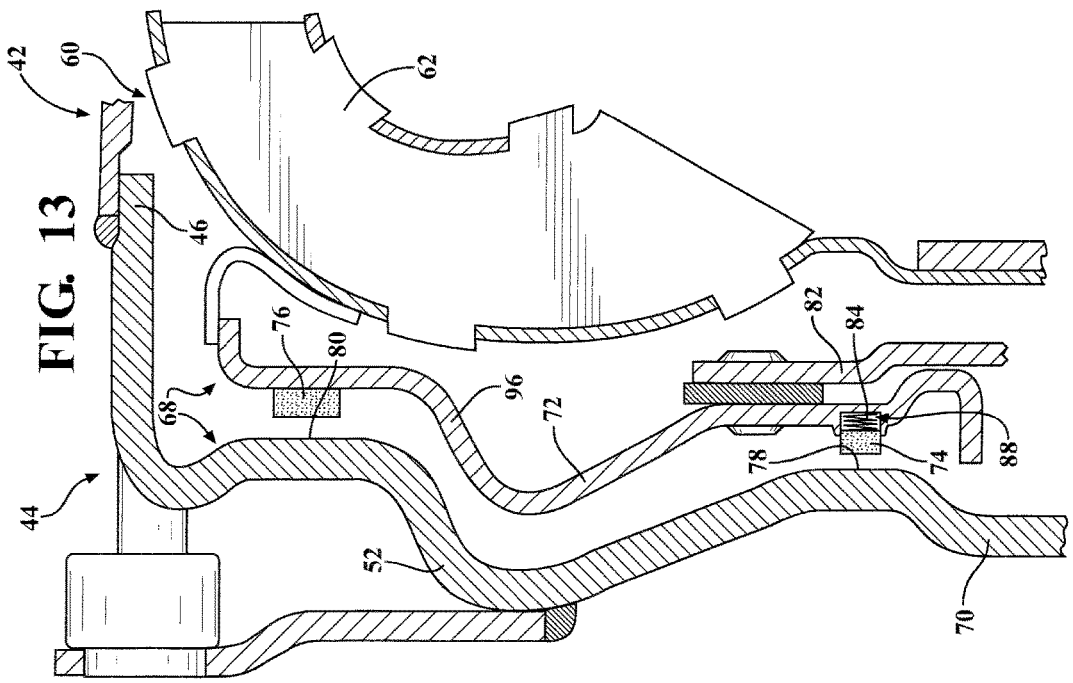
FIG. 14 is a cross-sectional view of the friction clutch shown in FIG. 13, showing the first and second clutch members in the partially engaged position.
Figure 15:
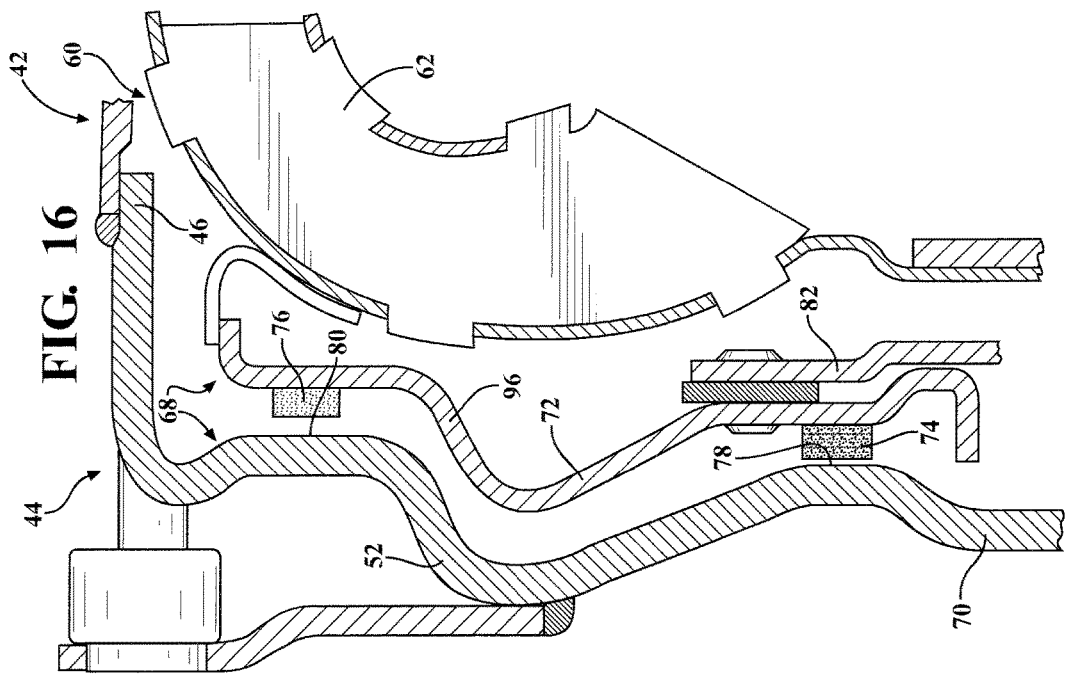
FIG. 15 is a cross-sectional view of the friction clutch shown in FIG. 13, showing the first and second clutch members in the fully engaged position.

The second clutch member 72 may integrally define the biasing member 84. As shown in FIGS. 7-9, the second clutch member 72 may have a primary body 96 and the biasing member 84 may be further defined as a flange 98 extending from the primary body 96, with the one of the first friction material 74 and the respective engagement surface 78 coupled to the flange 98. The flange 98 may be capable of elastically deflecting toward the second clutch member 72 to facilitate biasing of the one of the first friction member and the respective engagement surface 78 against the other one of the first friction member and the respective engagement surface 78 of the first clutch member 70. The flange 98 may be a plurality of flanges 98 radially positioned about the axis A, with the plurality of flanges evenly supporting and biasing the one of the first friction member and the respective engagement surface 78. Alternatively, the flange 98 may be a single flange having a substantially annular configuration about the axis A to evenly support and bias the one of the first friction member and the respective engagement surface 78. One having skill in the art will appreciate that the flange 98 may have any suitable configuration.

As shown in FIGS. 10-12, the friction clutch 68 may further include a camming block 100 biased by the biasing member 84 and movable transverse to the axis A, with the camming block 100 engaging and biasing the one of the first friction material 74 and the respective engagement surface 78 in a direction substantially parallel to the axis A. As shown in FIGS. 10-12, the camming block 100 may engage the engagement block 86 having the respective engagement surface 78. It is to be appreciated that the camming block 100 may engage the first friction material 74.

As shown in FIGS. 10-12, the one of the first and second clutch members 70, 72 defining the channel 88 may define a slot 102 transverse to the axis A, with the slot 102 opening into the channel 88. More specifically, the slot 102 may be substantially perpendicular to the axis A. It is to be appreciated that the slot 102 may defined at any suitable angle relative to the axis A.

The biasing member 84 may be disposed in the slot 102, with the biasing member 84 engaging each of the camming block 100 and the one of the first and second clutch members 70, 72 defining the channel 88. The camming block 100 may be at least partially disposed in the slot 102. Furthermore, the camming block 100 may extend into the channel 88, as will be described in greater detail below. The biasing member 84 may bias the camming block 100 in a direction transverse to the axis A.

As described above, the one of the first friction material 74 and the engagement block 86 may be at least partially disposed in the channel 88, with the one of the first friction material 74 and the engagement block 86 positioned between the camming block 100 and the cavity 48 of the housing 46.

As shown in FIGS. 10-12, the one of the first friction material 74 and the engagement block 86 may engage the camming block 100. The camming block 100 may have a camming surface 104 orientated at an angle relative to the axis A. The one of the first friction material 74 and the respective engagement surface 78 may be slidable along the camming surface 104 to facilitate biasing of the one of the first friction material 74 and the respective engagement surface 78 by the biasing member 84. More specifically, the biased one of the first friction material 74 and the engagement block 86 defining the respective engagement surface 78 moves along the axis A toward the camming block 100 when engaged by the other one of the first friction material 74 and the respective engagement surface 78 as the first and second clutch members 70, 72 move from the partially engaged positions (as shown in FIG. 11) to the fully engaged position (as shown in FIG. 12).

The angle of the camming surface 104 causes the biased one of the first friction material 74 and the engagement block 86 to slide along the camming surface 104 and move the camming block 100 into the slot 102 against the bias of the biasing member 84. When the first and second clutch members 70, 72 move from the fully engaged position to the partially engaged position, the bias exerted by the biasing member 84 to move the camming block 100 out of the slot 102 while the angle of the camming surface 104 causes the biased one of the first friction material 74 and the engagement block 86 to move out of the channel 88. In doing so, the biasing member 84 biases the biased one of the first friction material 74 and the engagement block 86 at an angle transverse to the axis A.

Although the camming block 100 is shown as a single camming block in the Figures, one having skill in the art will appreciate that the camming block 100 may be a plurality of camming blocks radially spaced about the axis A, with the camming blocks evenly supporting and biasing the biased one of the first friction material 74 and the engagement block 86.

As shown in FIGS. 16-18, the first friction material 74 may be internally biased toward the respective engagement surface 78. Said differently, the first friction material 74 may be compressible such that the first friction material 74 itself is biased toward the respective engagement surface 78. The compressibility of the first friction material 74 facilitates engagement of the first friction material 74 in the partially engaged position and continued movement of the first and second clutch members 70, 72 to the fully engaged position.

In one embodiment, the first and second friction materials 74, 76 are comprised of the same material, such as any one of the wet friction materials described above, with the first friction material 74 internally biased toward the respective engagement surface 78. As shown in FIGS. 16-18, the first friction material 74 and the second friction material 76 may be comprised of different wet friction materials. For example, the first friction material 74 may be comprised of a wet friction material which is more compressible than a wet friction material of the second friction material 76. Said differently, the first friction material 74 may be comprised of a wet friction material which is softer than the wet friction material of the second friction material 76. As such, wet friction material of the first friction material 74 is compressible to facilitate continued movement of the first and second clutch members 70, 72 to the fully engaged position, while the wet friction material of the second friction material 76 may be harder than the wet friction material of the first friction material 74 to facilitate lock-up of the first and second clutch members 70, 72 through the second friction material 76. One having skill in the art will appreciate that each of the first and second friction materials 74, 76 may be comprised of any suitable material capable of internally biasing the first friction material 74 toward the respective engagement surface 78.

One having skill in the art will appreciate that the first friction material 74 may be engageable with the respective engagement surface 78 in the fully engaged position. For example, as shown in FIGS. 6, 9, 12, 15, 18, and 21, the first friction material 74 maintains engagement with the respective engagement surface 78 between and at the partially and fully engaged positions through the bias of the biasing member 84 (i.e., the biasing member 84 allows the first friction material 74 to move such that the second friction material 76 may engage the respective engagement surface 80). The engagement of the first friction material 74 with the respective engagement surface 78 in the fully engaged position provides friction in addition to the friction between the second friction material 76 and the respective engagement surface 80 to further facilitate lock-up of the first and second clutch members 70, 72.

The invention has been described in an illustrative manner, and it is to be understood that the terminology which has been used is intended to be in the nature of words of description rather than of limitation. As is now apparent to those skilled in the art, many modifications and variations of the subject invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A friction clutch for selective direct coupling of a rotatable drive member to a rotatable driven member, said friction clutch comprising:

a first clutch member and a second clutch member movable toward and away from each other along an axis between a disengaged position, a partially engaged position, and a fully engaged position, with one of said first and second clutch members configured to be coupled to the drive member and the other one of said first and second clutch members configured to be coupled to the driven member; and a first friction material and a second friction material both positioned between said first and second clutch members, with said first and second friction materials each independently coupled to one of said first and second clutch members and each independently engageable with an engagement surface of the other one of said first and second clutch members;

wherein said first friction material is engageable with said respective engagement surface in said partially engaged position for initiating the selective direct coupling between the drive member and the driven member, and wherein said second friction material is engageable with said respective engagement surface in said fully engaged position for completing the selective direct coupling between the drive member and the driven member.

2. The friction clutch as set forth in claim 1, wherein one of said first friction material and said respective engagement surface is biased toward the other one of said first friction material and said respective engagement surface to progressively increase frictional engagement between said first and second clutch members as said first and second clutch members move from said partially engaged position to said fully engaged position.

3. The friction clutch as set forth in claim 2, further including a biasing member coupled to and biasing said one of said first friction material and said respective engagement surface, which is biased toward said other one of said first friction material and said respective engagement surface.

4. The friction clutch as set forth in claim 3, wherein said second clutch member integrally defines said biasing member.

5. The friction clutch as set forth in claim 4, wherein said second clutch member has a primary body and said biasing member is further defined as a flange extending from said primary body, with said one of said first friction material and said respective engagement surface coupled to said flange.

6. The friction clutch as set forth in claim 3, wherein said biasing member biases in a direction substantially parallel to said axis.

7. The friction clutch as set forth in claim 3, wherein said biasing member biases in a direction transverse to said axis.

8. The friction clutch as set forth in claim 7, further including a camming block biased by said biasing member and movable transverse to said axis, with said camming block engaging and biasing said one of said first friction material and said respective engagement surface in a direction substantially parallel to said axis.

9. The friction clutch as set forth in claim 8, wherein said camming block has a camming surface orientated at an angle relative to said axis, with said one of said first friction material and said respective engagement surface slidable along said camming surface to facilitate biasing of said one of said first friction material and said respective engagement surface by said biasing member.

10. The friction clutch as set forth in claim 2, wherein said first friction material is biased toward said respective engagement surface.

11. The friction clutch as set forth in claim 10, wherein said first friction material is internally biased toward said respective engagement surface.

12. The friction clutch as set forth in claim 1, wherein said first clutch member is fixed along said axis and said second clutch member is movable along said axis with said movement of said first and second clutch members toward and away from each other facilitated by movement of said second clutch member along said axis.

13. The friction clutch as set forth in claim 1, wherein said first and second friction materials are radially offset about said axis.

14. The friction clutch as set forth in claim 13, wherein said first friction material is positioned between said axis and said second friction material.

15. The friction clutch as set forth in claim 1, wherein said second friction material is coupled to said second clutch member.

16. The friction clutch as set forth in claim 1, wherein said first friction material is coupled to said second clutch member.

17. The friction clutch as set forth in claim 1, wherein said first friction material is coupled to said first clutch member.

18. The friction clutch as set forth in claim 1, wherein said first and second friction materials are comprised of a wet friction material.

19. The friction clutch as set forth in claim 1, wherein said first and second friction materials are positioned on substantially parallel planes extending transverse to said axis in said disengaged position.

20. The friction clutch as set forth in claim 1, wherein said engagement of said second friction material with said respective engagement surface transmits a greater amount of torque from said drive member to said driven member than said engagement of said first friction material with said respective engagement surface.

21. The friction clutch as set forth in claim 1, wherein said first friction material is engageable with said respective engagement surface in said fully engaged position.

22. A torque converter for selectively coupling a prime mover to a transmission, said torque converter comprising:
  an impeller as a drive member and configured to be rotatably fixed to the prime mover;
  a shaft as a driven member and configured to be rotatably fixed to the transmission;
  a turbine rotatably fixed to said shaft and fluidly coupled to said drive member, with said fluid coupling between said turbine and said drive member facilitating indirect coupling between said turbine and said drive member to multiply torque transfer between said drive member and said driven member; and
  a friction clutch for selective direct coupling of said rotatable drive member to said rotatable driven member, said friction clutch comprising:
    a first clutch member and a second clutch member movable toward and away from each other along an axis between a disengaged position, a partially engaged position, and a fully engaged position, with one of said first and second clutch members coupled to said drive member and the other one of said first and second members coupled to said driven member; and
    a first friction material and a second friction material both positioned between said first and second clutch members, with said first and second friction materials each independently coupled to one of said first and second clutch members and each independently engageable with an engagement surface of the other one of said first and second clutch members;
    wherein said first friction material is engageable with said respective engagement surface in said partially engaged position to initiate said selective direct coupling between said drive member and said driven member, and wherein said second friction material is engageable with said respective engagement surface in said fully engaged position to complete said selective direct coupling between said drive member and said driven member.

23. The torque converter as set forth in claim 22, wherein said impeller has a housing defining a cavity and a plurality of vanes extending from said housing into said cavity, wherein said housing defines one of said first and second clutch members such that said one of said first and second clutch members is integrally coupled with said impeller.

24. The torque converter as set forth in claim 22, wherein one of said first and second clutch members is further defined as a piston which is fluidly actuated to move said first and second clutch members toward and away from each other along said axis.

* * * * *